United States Patent [19]

Garbagnati

[11] Patent Number: 5,293,989
[45] Date of Patent: Mar. 15, 1994

[54] CHAIN CONVEYOR LINK PROVIDED WITH A PIN-LOCKING DEVICE

[75] Inventor: Carlo Garbagnati, Castello Brianza, Italy

[73] Assignee: Regina Sud S.p.A., Latina, Italy

[21] Appl. No.: 70,678

[22] Filed: Jun. 2, 1993

[30] Foreign Application Priority Data

Jun. 10, 1992 [IT] Italy .................. MI 92 U 000592

[51] Int. Cl.$^5$ ............................................. B65G 17/06
[52] U.S. Cl. ..................................... 198/853; 198/851
[58] Field of Search ................ 198/850, 851, 852, 853

[56] References Cited

U.S. PATENT DOCUMENTS

| | | | |
|---|---|---|---|
| 4,709,807 | 12/1987 | Poerink | 198/851 |
| 4,832,187 | 5/1989 | Lapeyre | 198/851 |
| 4,858,753 | 8/1989 | Hodlewsky | 198/853 |
| 4,893,710 | 1/1990 | Bailey et al. | 198/853 |
| 5,000,312 | 3/1991 | Damkjaer | 198/853 |
| 5,020,659 | 6/1991 | Hodlewsky | 198/853 |
| 5,125,504 | 6/1992 | Corlett et al. | 198/850 |

Primary Examiner—Cheryl L. Gastineau
Attorney, Agent, or Firm—Stevens, Davis, Miller & Mosher

[57] ABSTRACT

A link (10) of a chain conveyor has a plane (12) region terminating at at least one end thereof with an enlarged articulation element (13) projecting downwardly from the plane (12) and passed through by a hole (15) parallel to the plane (12) for the introduction of a pivot pin (11). The enlarged element (13) has at least at one end (17) close to the hole (15) opening, a plug (18) preventing the pivot pin (11) from slipping out of the hole itself. The plug (18) has facing parallel resilient arms (20, 21) terminating with undercut teeth (22, 23) projecting towards each other for fitting in corresponding rectilinear undercuts (29, 30) disposed parallelly on opposite sides of the enlarged element (13) close to the hole (15) opening. The plug (18) further comprises a projection (26) between said arms (21, 21) that is designed to be fitted in the pin-receiving hole (15) for preventing the plug (18) from sliding in at least one direction normal to the pin on fitting of the teeth (22, 23) in the corresponding undercuts (29, 30).

5 Claims, 2 Drawing Sheets

CHAIN CONVEYOR LINK PROVIDED WITH A PIN-LOCKING DEVICE

In the technique of chain conveying planes, the problem of locking the pins between the links so as to avoid slipping off of same is known.

Usually inserts are used that, once the pin has been fitted in place, close passage to the outside. Of course these inserts must not slip out of their seats as a result of vibrations when the conveyor is in operation. At the same time, given the great number of pins to be mounted for making a complete conveying line, these inserts must be of easy installation and low cost. In order to achieve quick mounting and safe fastening, in the known art said inserts are provided with undercuts that are snap-fitted into corresponding undercuts formed in the link. These systems of the known art however impose the use, both for the link and the insert, of moulds having a relatively complicated shape and provided with movable drawers in order to accomplish mating undercuts, as otherwise withdrawal from the mould would be inhibited. The above inconvenience affects the cost of the finished product and limits productivity, due both to the necessity of moving the different drawers on each moulding operation and to the fact that the space taken up by the movable drawers restrains the number of pieces that can be moulded every time in a single moulding machine.

The general object of the present invention is to eliminate the above drawbacks by providing a conveying chain having elements capable of locking the pivot pins against slipping off, which can be easily set in place, are safe and of low cost and do not require moulds with movable drawers.

In view of the above object, in accordance with the invention a link of a chain conveyor has been devised which has a plane region thereof terminating at at least one end with an enlarged articulation element projecting downwardly from the plane and passed through by a hole parallel to the plane for the introduction of a pivot pin, said enlarged element having at least at one end close to the hole opening, a plug preventing the pivot pin from slipping out of the link itself, the plug being provided with facing parallel resilient arms terminating with undercut teeth projecting towards each other for fitting in corresponding rectilinear undercuts disposed parallelly on opposite sides of the enlarged element close to the hole opening, the plug further comprising a projection between said arms that is designed to be fitted in the pin-receiving hole for preventing the plug from sliding in at least one direction normal to the pin on fitting of the teeth in the corresponding undercuts.

For better explaining the innovatory principles of the present invention and the advantages it offers over the known art, a possible embodiment of the invention putting into practice said innovatory principles will be given hereinafter by way of non-limiting example with the aid of the accompanying drawings, in which.

Figure 1:
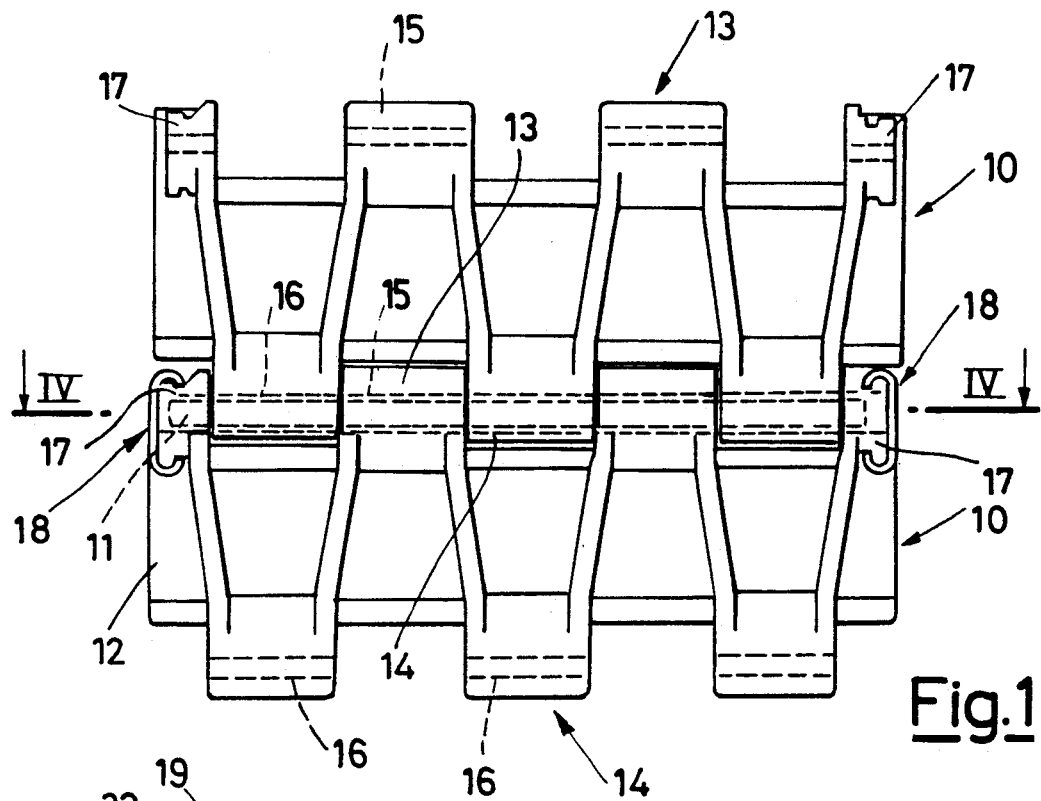
FIG. 1 is a partial plan view from bottom of the links of a conveyor in accordance with the invention.

Referring to the drawings, one portion of a conveyor seen from bottom is shown in FIG. 1. The conveyor is formed with a plurality of links 10 articulated with each other by means of transverse pivot pins 11. Only two links of said plurality are shown as the links are substantially identical with one another.

Each link has an upper plane region 12 having at the opposite ends thereof, enlarged articulation elements 13, 14 projecting downwardly and passed through by holes 15, 16 parallel to the plane. The articulation elements 13, 14 of side by side links are cut in a matching fashion so that they fit into each other thereby aligning the corresponding holes 15, 16 for introduction of the pins 11.

A conventional link of substantially known configuration has been hitherto described.

In accordance with the invention, once the links have been put in side by side relation as shown in FIG. 1 and the pin has been fitted in the aligned holes so that the links are hinged, the pin which is slightly shorter than the link width, is received between the end portions 17 of the link. An insert or locking plug 18 is fitted on said portions 17 so that it obstructs the pin passage hole in said portions 17 and prevents said pin from slipping off.

Figure 2:
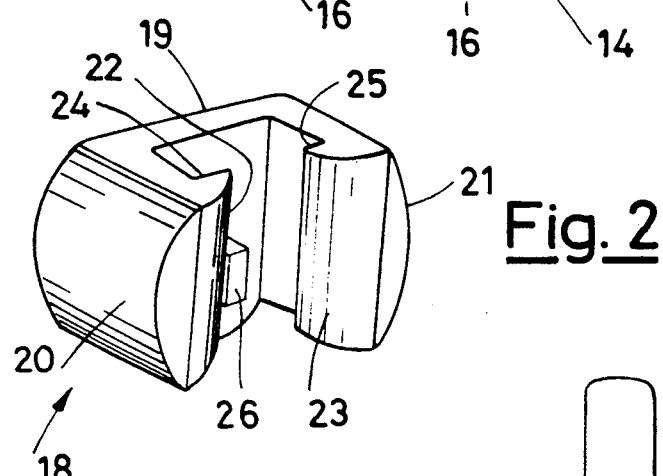
FIG. 2 is an enlarged perspective view of a pin-locking insert for the conveyor shown in FIG. 1.
Figure 3:
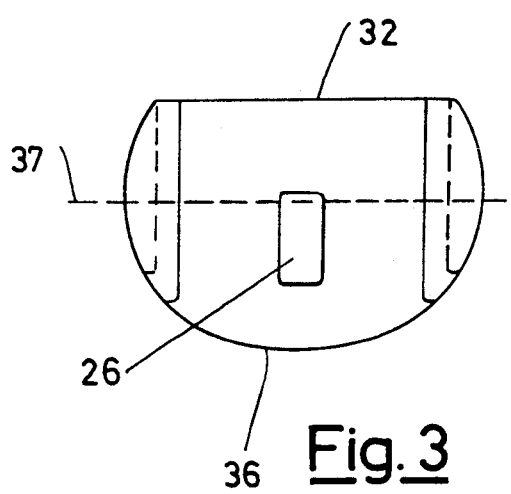
FIG. 3 is a front view of the insert seen in FIG. 2.

In FIGS. 2 and 3 the locking plug 18 is shown in greater detail. It comprises a base 19 from the opposite sides of which extend facing and parallel resilient arms 20, 21 which terminate at their end with respective teeth 22, 23 oriented towards each other and having a tapering shape in order to facilitate fitting of the link in place. Said teeth define each an abutment step or undercut 24, 25 on their portion facing the base 19. As well evident in FIG. 3, a projection or relief 26 of rectangular section for example, extends from the base 19 at a substantially central portion relative to the arms 20, 21.

Figure 4:
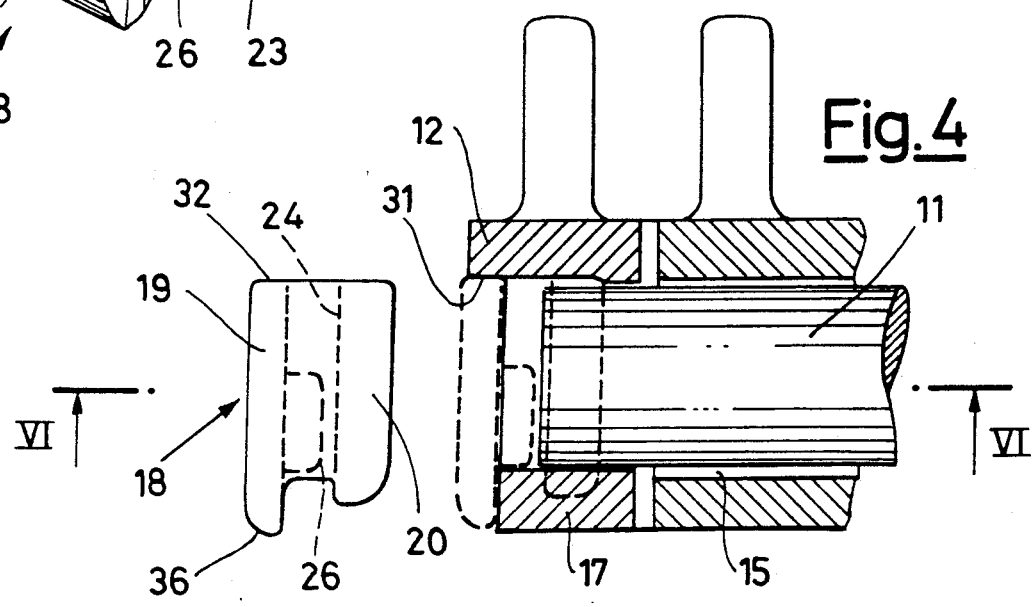
FIG. 4 is an enlarged part sectional view taken along line IV—IV in FIG. 1.
Figure 6:
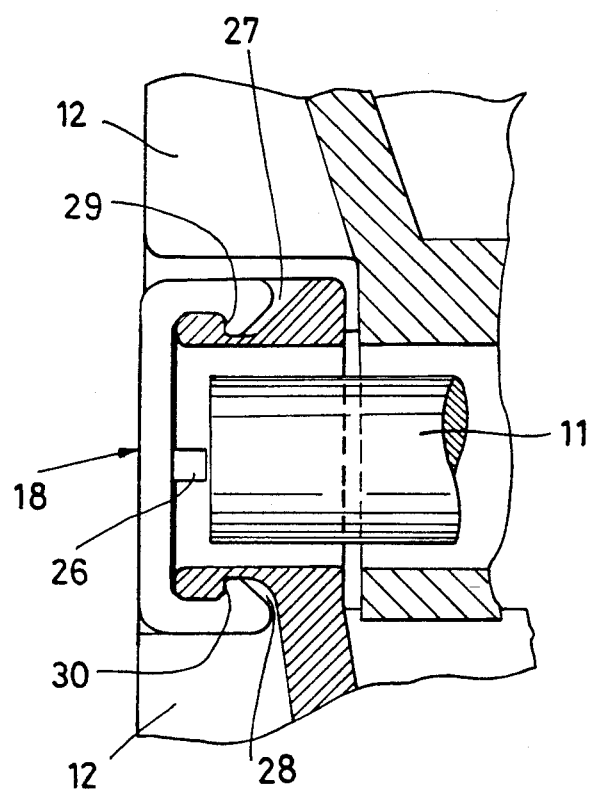
FIG. 6 is a part sectional view taken along line VI—VI in FIG. 4.

As clearly shown in FIG. 6, parallel and rectilinear side grooves 27, 28 are present on opposite sides of the enlarged element close to the end portion 17. Said grooves identify abutments or undercuts 29, 30 for snap receiving the plug teeth 22, 23, whereas the projection 26 is fitted in the hole 15 opening in the portion 17 receiving the pin 11. In FIG. 4 the plug is shown in solid line in its extracted position and in dotted line in its position fitted in the end portion 17.

In its inserted position the plug is prevented from carrying out a vertical upward movement (as shown in the figure) by the abutment 31 consisting of the link plane, being the articulation element formed with recessed end portions 17 so that said end portions are contained in the dimensions of the plane, the plug too being therefore substantially contained within the plane dimensions. The downward movement of the plug is on the contrary prevented by the relief 26 getting in contact with the inner lower edge of the hole 15.

Figure 5:
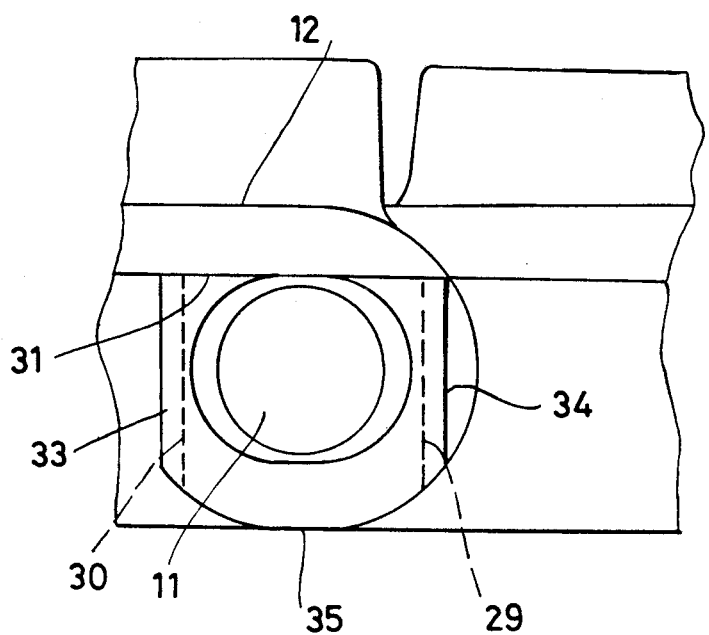
FIG. 5 is a side view of the links seen in FIG. 1, the locking insert being removed.

As shown in FIG. 3, the upper edge 32 of the plug is made flat so that it matches the projection 31 made flat too. As viewed from FIG. 5, the end portion 17 has side edges 33, 34 on which straight grooves 27, 28 parallel to each other are formed, and a lower edge 35 which is rounded off in order to enable the articulated movement between the links in the absence of sharp corners projecting downwardly. Therefore the plug 18 has a rounded lower portion 36 (FIG. 3) following the rounded extension of the edge 35. In this manner, when fitted on portion 17, the plug 18 follows the outline of said portion without exhibiting important side projections.

It is apparent that the positioning of the plugs into the respective seats on portions 17 is very quick, since it is sufficient to put them close to each other and exert pressure, so that they will be firmly fitted in place. In addition, since the plug projects very little, the chain movement is not hindered.

A further advantage is represented by the low production cost.

In fact, as a person skilled in the art can see from FIG. 3, the plug of the invention can be made of plastics and moulded with the use of a simple mould devoid of movable drawers and consisting of two mould plates the closure plane of which is coincident with a plane 37 (in dotted line) transverse to the plug, as diagrammatically shown in FIG. 3. Given the innovatory conformation of the plug, once it has been moulded it can be drawn out of the mould by merely moving the two mould halves away from each other in opposite directions perpendicularly to the plane 37, as in said directions there are no undercuts. It is possible to make a mould having a great number of plug moulding seats, which advantageously brings about a rapid and cheap production. Likewise, the link too can be moulded with the use of a simple mould having a closing plane substantially parallel to the link plane 12, the only necessary drawer being that for making the hole for the pin passage, which drawer however is usually present.

Obviously the above description applying the innovatory principles of the invention is given by way of example only and therefore must not be considered as a limitation of the scope of the invention as herein claimed.

For example, the shape of the chain links and their proportions may vary depending on the particular operating requirements. In addition, if desired, the relief 26 may have bigger sizes so that its shape conforms to the inner walls of the pin hole at least at two diametrically opposite positions in order to prevent the plug movement in the two ways, so that no contact between the plug edge and the lower portion of the abutment 31 is now required.

I claim:

1. Link (10) of a chain conveyor having a plane (12) region thereof terminating at at least one end with an enlarged articulation element (13) projecting downwardly from the plane (12) and passed through by a hole (15) parallel to the plane (12) for the introduction of a pivot pin (11), said enlarged element (13) having at least at one end (17) close to the hole (15), a plug (18) preventing the pivot pin (11) from slipping out of the hole itself, the plug (18) being provided with facing parallel resilient arms (20, 21) terminating with undercut teeth (22, 23) projecting towards each other for fitting in corresponding rectilinear undercuts (29, 30) disposed parallelly on opposite sides of the enlarged element (13) close to the hole (15), the plug (18) further comprising a projection (26) between said arms (21, 21) that is designed to be fitted in the pin-receiving hole (15) for preventing the plug (18) from sliding in at least one direction normal to the pin on fitting of the teeth (22, 23) in the corresponding undercuts (29, 30).

2. Link according to claim 1, characterized in that the undercuts (29, 30) on the sides of the enlarged element (13) extend in a direction normal to the link plane (12).

3. Link according to claim 1, characterized in that the end (17) of the enlarged element (13) is recessed for receiving the plug (18) within the dimensions of the plane (12) forming an abutment (31) for a side edge (32) of the plug.

4. Link according to claim 3, characterized in that said side edge (32) of the plug is flat so that its shape substantially matches that of a portion of the link plane.

5. Link according to claim 1, characterized in that the enlarged element (13) has a generally rounded section, the plug outline following said section at least partly.

* * * * *